United States Patent [19]

Waineo et al.

[11] Patent Number: 4,781,267

[45] Date of Patent: Nov. 1, 1988

[54] PASSIVE RESTRAINT CONTROL SYSTEM

[75] Inventors: Keith R. Waineo, Farmington Hills; Kenneth A. Freeman, Plymouth; Martin L. Bray, Rochester Hills, all of Mich.

[73] Assignee: Ford Motor Company, Dearborn, Mich.

[21] Appl. No.: 123,434

[22] Filed: Nov. 20, 1987

[51] Int. Cl.[4] .............................................. B60D 21/00
[52] U.S. Cl. .................................... 180/268; 280/802; 280/804
[58] Field of Search ................. 180/268; 280/802, 804

[56] References Cited

U.S. PATENT DOCUMENTS

| | | | |
|---|---|---|---|
| 4,116,295 | 9/1978 | Booth | 180/268 |
| 4,302,031 | 11/1981 | Nishimura et al. | 280/804 |
| 4,313,622 | 2/1982 | Suzuki et al. | 280/804 |
| 4,553,625 | 11/1985 | Tsuge et al. | 180/268 |
| 4,655,312 | 4/1987 | Frantom et al. | 180/268 |

*Primary Examiner*—Kenneth R. Rice
*Attorney, Agent, or Firm*—Daniel M. Stock; Clifford L. Sadler

[57] ABSTRACT

An improved motorized passive seatbelt system for an automotive vehicle includes an intertia responsive switch mounted on the vehicle which operates to prevent operation of the motor to move the seatbelt from an occupant restraining position to a free position when a predetermined impact occurs.

12 Claims, 2 Drawing Sheets

PASSIVE RESTRAINT CONTROL SYSTEM

BACKGROUND OF THE INVENTION

The present invention relates generally to passive seatbelt systems for automotive vehicles and more particularly to means for controlling such systems during emergency operating conditions.

DESCRIPTION OF THE PRIOR ART

Compliance with the United States Government's requirement for the installation of passive restraint systems for occupants of automotive vehicles has been effected by automotive manufacturers in many forms. These include both inflatable occupant restraints (air bags) and passive seatbelt systems. One type of widely used passive seatbelt system is the type in which an anchor for the seatbelt is moved by a motor between an occupant restraining position and a position facilitating ingress and egress from the vehicle. Exemplary of such systems is that shown in U.S. Pat. No. 4,313,622 to Suzuki et al. Responsive to operative conditions in the vehicle, the anchor is caused to move between these positions. While various forms of the system vary in precise operating sequence, they share the need to provide for the movement of the seatbelt anchor between the restraining position and the ingress/egress position in response to the opening of the vehicle door adjacent the passenger. During the critical time for operation of such a system, to restrain an occupant during a crash, however, it is desirable that this movement be inhibited. In the prior art, this has been effected by providing a mechanical lock of some type for the seatbelt anchor. Exemplary of such locks is that shown in U.S. Pat. No. 4,302,031, to Nishimura et al. While effective operationally, this approach necessitates the duplication of the mechanism at each movable seatbelt anchor adding to the weight, cost and complexity of the seatbelt system.

SUMMARY OF THE INVENTION

In order to prevent movement of the motorized seatbelt anchor from its occupant restraining position upon opening of the door in an emergency situation while reducing the outlay of weight, cost and complexity attendant the prior art systems, it is an object of the present invention to provide a passive restraint control system which controls the operation of the motorized system to prevent this movement during an emergency situation.

According to the main feature of the present invention; an inertia responsive switch is operatively connected to the portion of the vehicle electrical system configured to drive the seatbelt anchor in its normal operating sequence. This switch operates to permit normal operation of the vehicle occupant restraint system under all conditions except those in which the vehicle has been involved in an impact. According to one preferred embodiment of the present invention, the inertia switch operates to turn off transistorized circuits which are normally series connected with other operating switches of the occupant restraint system to provide voltage from the battery of the vehicle to a power circuit controlling operation of the restraint system motor which drives the seatbelt anchor.

BRIEF DESCRIPTION OF THE DRAWINGS

These and other objects and features will be apparent to those skilled in the automotive occupant restraint arts by reading the following description with reference to the accompanying drawing in which.

DESCRIPTION OF THE PREFERRED EMBODIMENT

Figure 1:
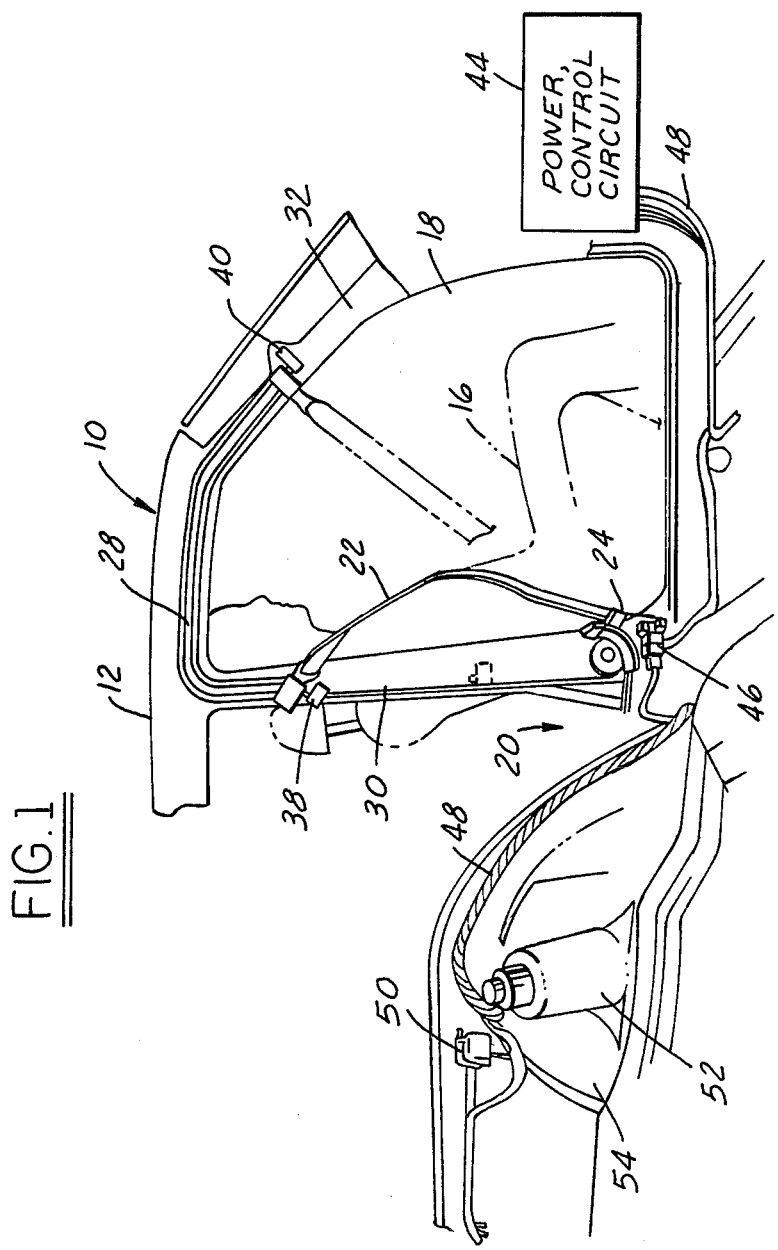
FIG. 1 is a diagrammatic side view of the inside of an automotive vehicle having installed therein a motorized passive seatbelt system embodying the emergency control system of the present invention.

Turning now to the drawings and in particularly to FIG. 1 thereof, an automotive vehicle 10 is illustrated as having a body 12 in which there is mounted a seat 14 for accommodating a vehicle occupant 16. A suitable aperture 18 is formed in the body 12 for receiving a door (not shown) in conventional manner. For purposes of understanding the present invention, a motorized passive seatbelt system of the type more fully disclosed in U.S. Pat. No. 4,313,622 indicated generally at 20 is illustrated as being installed in the body 12 of the vehicle 10. The restraint system 20 includes a seatbelt 22 extending between a seatbelt retractor indicated diagrammatically at 24 and a seatbelt anchor 26. The seatbelt anchor 26 is mounted for sliding movement within a track 28 formed on inner surfaces of the vehicle body 12 and extends between an occupant restraining portion near the top of an intermediate body pillar 30 and an open position facilitating ingress and egress to and from the vehicle at a position below the top of the forward pillar 32 of the vehicle 10. A drive motor 34 is positioned near the base of the intermediate pillar 30 and operates to move a drive tape 36 upwardly and downwardly as viewed in FIG. 1 to move the seatbelt anchor 26 between the restraining and free positions by driving the anchor 26 along the track. First and second conventional limit switches 38, 40, respectively, are positioned at the ends of the track 28 and an override switch 42 is carried in the body 12 adjacent the door aperture 18 to sense and communicate the open or closed position of the door. The motor 34 and the switches 38, 40, 42 are operatively connected to the vehicle's electrical system, a portion of which is indicated at 44 as the power and control circuit of the system through suitable connectors such as the connector block 46. A wiring harness 48 is suitably mounted on portions of the vehicle body 12 for effecting the necessary electrical interconnections between the system of the present invention and the vehicle electrical system. At a position remote from the motor 34, a known inertia switch 50 responsive to a predetermined level of impact on the vehicle 10 is mounted on an interior portion of vehicle body 12 in known manner. In the preferred embodiment shown, this mounting is effected in a position rearwardly spaced from the suspension mounting portion 52 of the vehicle body 12 slightly rearward of the wheel well 54.

During normal operation of the occupant restraint system 20, an occupant 16 may enter the vehicle and sit on the seat 14 and upon turning on the ignition of the vehicle 10, the power and control circuit 44 operates to permit the motor 34 to draw the seatbelt anchor 26 from the dotted line position of FIG. 1 to the full line position of FIG. 1 by appropriate rotation of the motor 34 to draw the tape 36 downwardly along pillar 30. When the limit switch 38 is contacted by the seatbelt anchor 26, the power to the motor 34 is interrupted. If the door is opened, operating the switch 42, the Power is supplied to the motor 34 to drive the seatbelt anchor 26 to the dotted line position of FIG. 1 and power is again interrupted upon contact of the anchor 26 with the limit switch 40. This operation occurs for both "off" and "on" conditions of the ignition. The present invention improves upon this operation through agency of the inertia switch 50 in that the last described motion is inhibited when the switch 50 operates to sense some impact on the vehicle. Upon such an occurrence, even if the switch 42 operates to sense the opening of the door, the switch 50 is arranged to interrupt power to the motor 34.

Figure 2:
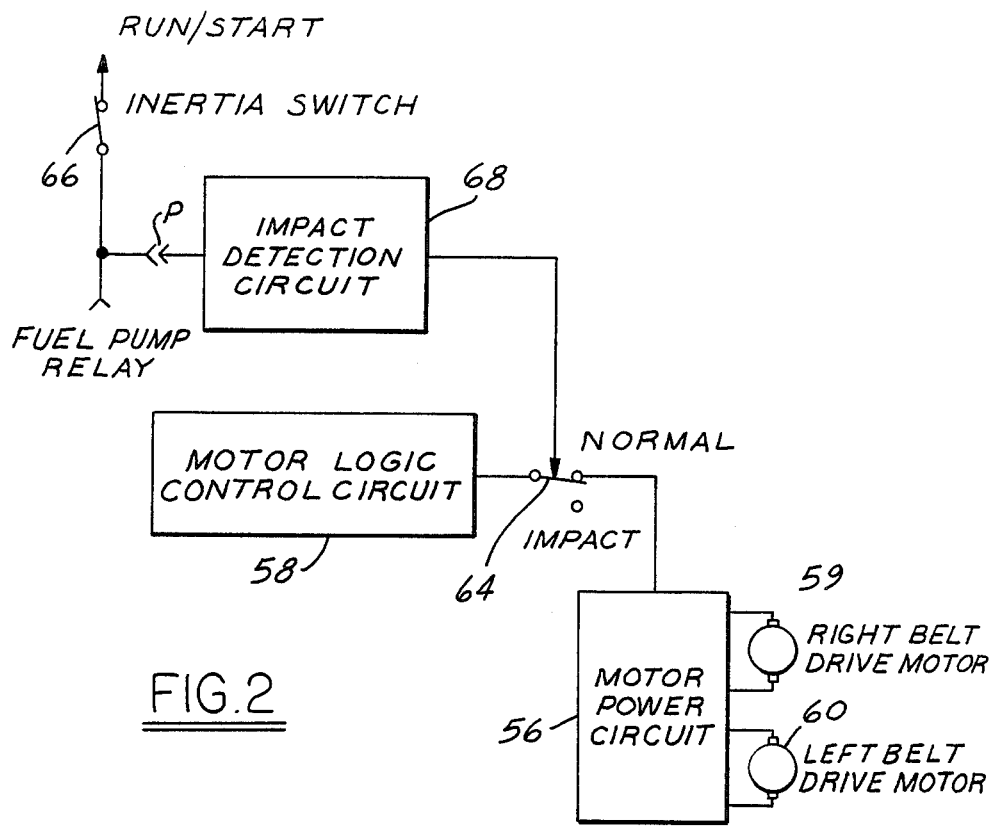
FIG. 2 is a flow diagram illustrating the operation of the emergency control system of the present invention.

Turning next to FIG. 2, the manner in which the inertia switch 50 cooperates with the electrical system of the vehicle 10 to effect the desired disabling of the motor drive system of the restraint system 20 can be readily appreciated. Voltage from the battery of the vehicle 10 is applied to operate the restraint system 20 through the ignition switch of the vehicle 10 indicated by the nomenclature RUN/START in FIG. 2. The power, control circuit 44 of FIG. 1 is illustrated diagrammatically in FIG. 2 as including a motor power circuit 56 and a motor logic control circuit 58. The motor power circuit 56 may be of any conventional design which effects the reversible application of voltage to the motor 34 which is illustrated in FIG. 2 as including a pair of drive motors 58, 60 which are preferably positioned adjacent each of the two front doors of the vehicle 10. The motor logic control circuit 58 is illustrated as being series connected to the motor power circuit 56 through switching device 64 which is responsive to the operation of the inertia switch 50. In the flow chart showing of FIG. 2, the inertia switch 50 is illustrated as a normally closed switch 66 connected between the RUN/START ignition switch and an impact detection circuit 68 and other portions of the electrical system of the vehicle 10, as indicated by the nomenclature "FUEL PUMP RELAY." For normal operation in the switch position shown in FIG. 2, battery voltage may be applied to the motor power circuit. Upon opening the switch 66, the impact detection circuit 68 operates to move the switching device 64 to the impact position illustrated and power to the motor power circuit 56 is interrupted. Power may also be interrupted to other portions of the Vehicle Electrical system, such as the FUEL PUMP RELAY. The motor logic control circuit 58 may also operate to interrupt power to the motor 59, 60 responsive to conditions of the ignition, the limit switches 38, 40 and the override switch 42.

It will be appreciated that the motor power circuit 56 and the motor logic control circuit 58 may each be of any suitable design to effect appropriate motor movement to shift the seatbelt anchor 26 between its restraining and free positions that is responsive to ignition switch condition, the open or closed condition of limit switches 38, 40 and open or closed condition of override switch 42. Their detail design does not form a part of the present invention. However, for designs of such circuits in which transistor elements are used for switching, the schematic of FIG. 3 illustrates a preferred embodiment for effecting such switching.

Figure 3:
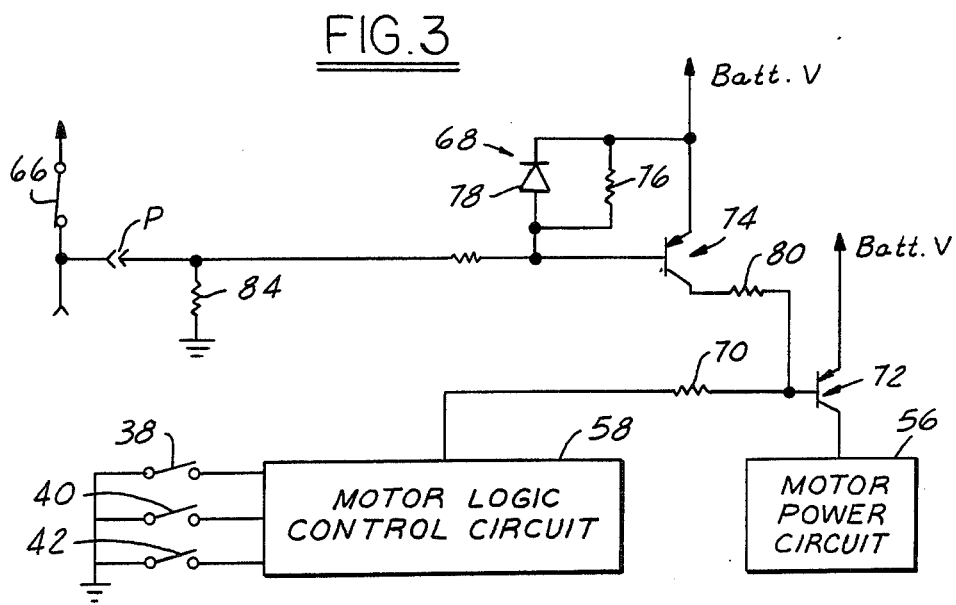
FIG. 3 is a simplified schematic of portions of the electrical system of a vehicle embodying one embodiment of the emergency control system of the present invention.

It can be seen in FIG. 3 that switches 38, 40, 42 are arranged in parallel fashion for connection to the motor logic control circuit 58, which may be connected through a resistor 70 to the base of a transistor 72. The transistor 72 is connected through its emitter to a source of battery voltage and through its collector to the motor power circuit 56. It is through the transistor 72 that switching is effected between the motor power circuit 56, the motor logic control circuit 58 and the impact detection circuit 68. The transistor 72 is one exemplary embodiment of the switching device 64 of FIG. 2. The impact detection circuit 68 is illustrated in FIG. 3 as including another transistor 74. Its emitter is likewise connected to battery voltage and through a resistor 76 to its base around a diode 78 in a conventional manner for transient voltage protection. The collector of the transistor 74 is connected through a resistor 80 to the base of the transistor 72 and the base of the transistor 74 is connected through resistor 82 to the inertia switch 66. A ground connection as indicated through the resistor 84 is of course provided. With the switch 66 in its normally closed position, the voltage at point "P" is high and the transistor 74 is off; that is, it is not passing any current to the base of the transistor 72. Accordingly, if any of the switches 38, 40, 42 are operated to apply voltage to the base of the transistor 72, current flows to the motor power circuit 56 and the motors 58 and/or 60 can be operated. Upon impact to the vehicle, the inertia switch 50 which may be any commercially available inertia responsive designs operates in a manner equivalent to the opening of the switch 66 from the position shown in FIG. 3. When the switch 66 opens, the resistor 84 which is chosen to have relatively low resistance in comparison to the resistor 82 effects reduction in the voltage at the base of the transistor 74. When the base voltage of the transistor 74 is low, current can flow from the battery through transistor 74 and the resistor 80, which has a relatively low resistance, as compared to the resistor 70, to switch off both the base and emitter of transistor 72. This effects the overriding of any power demand from the motor logic control circuit 58 and power operation to drive the motor from the motor power circuit 56.

While only one embodiment of the present invention has been described, others are possible without departing from the scope of the appended claims.

We claim:

1. In an automobile passive seatbelt system of the type wherein a seatbelt retractor is mounted on the automobile body and a seatbelt extends from the retractor to an anchor mounted in a track mounted proximate a door opening of the body, the anchor being movable along the track between a position restraining an occupant of the automobile and an open position permitting ingress and egress of an occupant to and from the automobile, under the influence of an electric motor to which power is supplied by the automobile electrical system and to which the anchor is drivingly engaged, and having means for operating the motor to drive the anchor from the restraining position to the open position in response to the opening of the automobile door, an improvement comprising inertia responsive switch means for sensing the occurrence of a predetermined level of impact on the automobile, and means responsive to the switch means for preventing operation of the electric motor to effect movement of the anchor between the restraining and open positions.

2. In an automobile passive seatbelt system of the type wherein a seatbelt retractor is mounted on the automobile body and a seatbelt extends from the retractor to an anchor mounted in a track mounted proximate a door opening of the body, the anchor being movable along the track between a position restraining an occupant of the automobile and an open position permitting ingress and egress of an occupant to and from the automobile, under the influence of an electric motor to which power is supplied by the automobile electrical system and to which the anchor is drivingly engaged, and having means for operating the motor to drive the anchor from the restraining position to the open position in response to the opening of the automobile door, an improvement comprising means for sensing the occurrence of a predetermined level of impact on the automobile, and means responsive to the sensing means for preventing operation of the electric motor to effect movement of the anchor between the restraining and open positions.

3. A motorized passive seatbelt system for an automotive vehicle having:

a source of electrical power, an electric motor mounted on the vehicle, a seatbelt anchor slidably mounted on the vehicle for movement between an occupant restraining position and a free position, means for drivingly engaging the motor with the anchor to effect the movement thereof, control means operatively connected to the electrical power source for effecting operation of the motor, means for sensing open and closed conditions of a door of the vehicle, means for effecting operation of the control means to drivingly operate the motor to drive the anchor from the occupant restraining position to the open position upon the sensing means sensing the open condition of the vehicle door, and means for sensing the occurrence of a predetermined level of impact on the vehicle and for preventing the driving operation of the motor.

4. A motorized passive seatbelt system as defined in claim 3 wherein the impact sensing means comprises inertia responsive switch means mounted on the body.

5. A motorized passive seatbelt system as defined in claim 4 wherein the inertia responsive switch means is mounted on the vehicle at a position remote from the door.

6. A motorized passive seatbelt system as defined in claim 3 wherein the means for sensing and preventing comprises:

inertia responsive switch means mounted on the body and operatively connected to the electrical power source;

other switch means operatively connected between the inertia responsive switch means and the control means and operative to prevent operation of the motor when the door sensing switch means senses a door open condition.

7. A motorized passive seatbelt system as defined in claim 6 wherein the other switch means are transistors.

8. A motorized passive seatbelt system as defined in claim 3 wherein the control means comprises:

a power circuit for selectively operating the motor for movement between the restraining and free positions; and a control circuit operatively connected to the power circuit for enabling the operation of the power circuit;

and the sensing and preventing means comprises:

switch means operative to prevent operation of the power circuit.

9. A motorized passive seatbelt system as defined in claim 4 wherein the means for sensing and preventing comprises:

inertia responsive switch means mounted on the body and operatively connected to the electrical power source;

other switch means operatively connected between the inertia responsive switch means and the control means and operative to prevent operation of the motor when the door sensing means senses a door open condition.

10. A motorized passive seatbelt system as defined in claim 4 wherein the control means comprises:

a power circuit for selectively operating the motor for movement between the restraining and free positions; and a control circuit operatively connected to the power circuit for enabling the operation of the power circuit;

and the sensing and preventing means comprises:

switch means operative to prevent operation of the power circuit.

11. A motorized passive seatbelt system as defined in claim 9 wherein the other switch means are transistors.

12. A motorized passive seatbelt system for an automotive vehicle having:

a source of electrical power, an electric motor mounted on the vehicle, a seatbelt anchor slidably mounted on the vehicle for movement between an occupant restraining position and a free position, means for drivingly engaging the motor with the anchor to effect the movement thereof, control means operatively connected to the electrical power source for effecting operation of the motor, means for sensing open and closed conditions of a door of the vehicle, means for effecting operation of the control means to drivingly operate the motor to drive the anchor from the occupant restraining position to the open position upon the sensing means sensing the open condition of the vehicle door, inertia responsive switch means mounted on the body and operatively connected to the electrical power source; and other switch means operatively connected between the inertia responsive switch means and the control means and operative to prevent operation of the motor when the door sensing means senses door open condition.

* * * * *

Notice of Adverse Decision in Interference

In Interference No. 102,347, involving Patent No. 4,781,267, K. R. Wained, K. A. Freeman, M. L. Bray, PASSIVE RESTRAINT CONTROL SYSTEM, final judgement adverse to the patentees was rendered Jan. 23, 1991, as to claims 1-12.

*(Official Gazette March 5, 1991)*